United States Patent [19]

Shevlin

[11] Patent Number: 4,918,859
[45] Date of Patent: Apr. 24, 1990

[54] STRUCTURE FOR GROWING MUSHROOMS

[76] Inventor: Thomas S. Shevlin, Rt. 1, Box 139, Lower Salem, Ohio 45745

[21] Appl. No.: 263,971

[22] Filed: Oct. 28, 1988

Related U.S. Application Data

[63] Continuation of Ser. No. 63,030, Jun. 17, 1987, abandoned.

[51] Int. Cl.$^5$ .............................................. A01G 1/04
[52] U.S. Cl. ...................................................... 47/1.1
[58] Field of Search .............................. 47/1.1, 10-12, 47/57.5; 435/254

[56] References Cited

U.S. PATENT DOCUMENTS

| | | | |
|---|---|---|---|
| 3,286,400 | 11/1966 | Gruenewaelder | 47/57.5 |
| 3,992,808 | 11/1976 | Stengel | 47/1.1 |
| 4,226,047 | 10/1980 | Maaigwee | 47/1.1 |
| 4,646,465 | 3/1987 | Fujimoto | 47/1.1 |
| 4,698,305 | 10/1987 | Hansson | 435/254 |

FOREIGN PATENT DOCUMENTS

| | | | |
|---|---|---|---|
| 2750009 | 5/1978 | Fed. Rep. of Germany | 47/1.1 |
| 117557 | 10/1978 | Japan | 47/1.1 |
| 16615 | 1/1983 | Japan | 47/1.1 |
| 2236417 | 10/1987 | Japan | 435/254 |
| 2236419 | 10/1987 | Japan | 435/254 |
| 3014642 | 1/1988 | Japan | 435/254 |
| 1210730 | 2/1986 | U.S.S.R. | 71/5 |
| 520355 | 4/1940 | United Kingdom | 47/1.1 |

OTHER PUBLICATIONS

San Antonio, James P., "Cultivation of the Shitake Mushroom", Journ. Amer. Soc. Hort. Sci., vol. 16(2), Apr. 1981, pp. 151-156.
Chang, "The Biology & Cultivation of Edible Mushrooms", Academic Press 1978, pp. 426-434.

Primary Examiner—James R. Feyrer
Attorney, Agent, or Firm—Jacobson & Johnson

[57] ABSTRACT

A method and structure for growing mushrooms through use of slab wood and cut round wood chunks as the host wood with the host wood having a passage for internally watering of the host wood to maintain the proper moisture content in the host wood as the host wood is supported by an external framework.

14 Claims, 3 Drawing Sheets

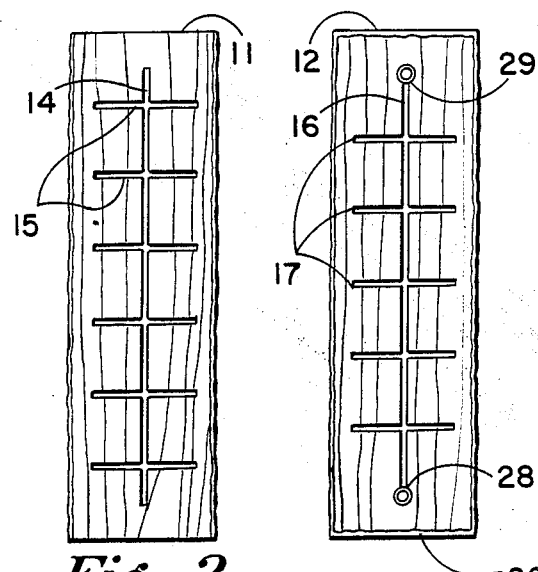
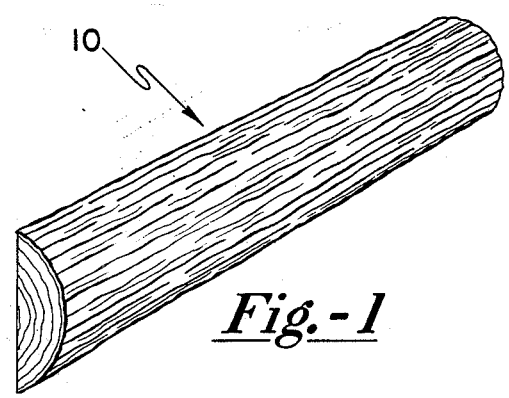
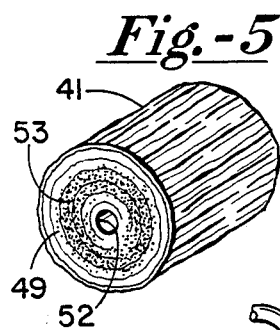
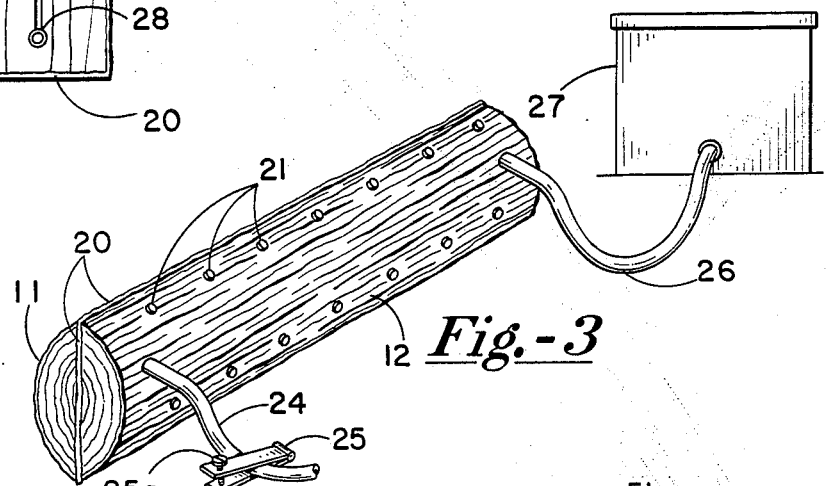
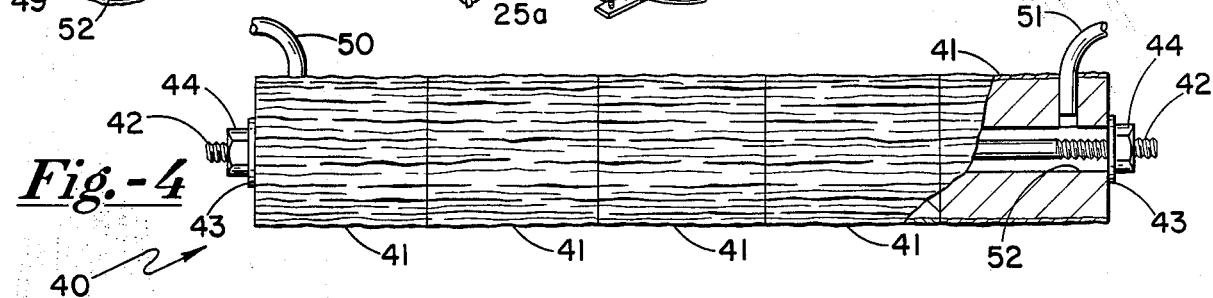
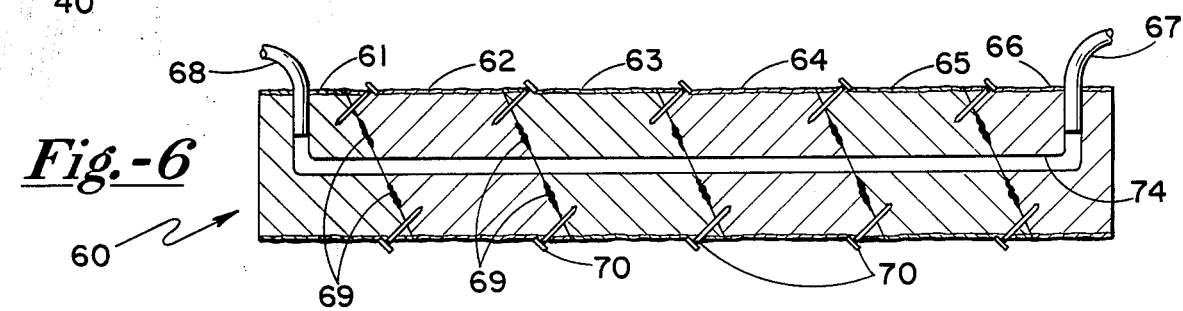
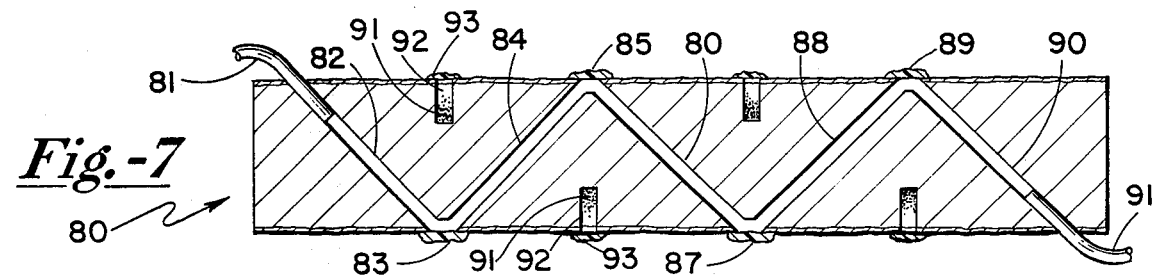

STRUCTURE FOR GROWING MUSHROOMS

This application is a continuation of application Ser. No. 063,030, filed June 17, 1987, now abandoned.

FIELD OF THE INVENTION

This invention relates generally to mushrooms and, more specifically, to structures and method for growing forest mushrooms in round wood and slab wood.

BACKGROUND OF THE INVENTION

The concept of growing mushrooms generally involves mushroom spawn inoculation of blind holes in round wood such as hardwood tree limbs or tree trunks. Typically, blind holes are spaced circumferentially every three-to-four inches and lengthwise approximately every 6-to-12 inches. In order to get the mushroom spawn to rapidly penetrate the sapwood, one drills holes radially since the spore undergo a series of direct cell division that produce elongated filaments faster in the lengthwise direction than the radial direction. Typically, the wood is inoculated with the mushroom spore by inserting spawn in either sawdust or plug form into the blind hole and then sealing the hole, usually with wax, to retain moisture and prevent influx of insects. Once inoculated, the spore begins to undergo cell division. As the spore divides or runs, it forms mycelium filaments which derive their nourishment almost solely from the sapwood. After the mushrooms emerge through the bark, they are periodically harvested.

The process of raising these mushrooms involves five basic steps. The first step is to inoculate the host wood with the spawn. Next, the host wood and spawn are allowed to incubate for a period of time. The next phase is the spawn run where the spore begin to germinate to produce mycelium filaments. In the next stage the mushrooms form (i.e., the fruiting stage). Finally, the mushrooms are harvested. Since the mushroom derives its nourishment from the host wood, it is important that the proper mushroom growing conditions are maintained.

DESCRIPTION OF THE PRIOR ART

One method of forming blind holes into round wood is shown in the Fujimoto EPC patent application No. 0166040. Fujimoto makes multiple spaced saw cuts into the outside of the round wood. He then inserts half-moonshaped plugs of spawn into the saw cuts. According to Fujimoto, his method provides an improvement because mushroom spore are spread over a broad area. Also, since growth occurs more rapidly along the longitudinal axis of the log than the radial axis, the mycelium grows quickly, thus shortening the time to harvest.

The Chugoku Japanese patent No. 117557 teaches the drilling of blind holes in logs and filling the holes with polyurethane expanded materials that act as a stopper. Typically, the plugs are saturated with 30-to-90% water before insertion.

The Mee U.S. Pat. No. 4,127,965 teaches the initial growing of Shiitake mushrooms by mixing cellulosic material, starch and proteins in a flexible container. The contents and the container are sterilized. After sterilizing, the mixture is inoculated with mushroom spawn. After incubation, the mixture is inoculated in a log.

The Maaijwee U.S. Pat. No. 4,226,047 teaches the use of an aluminum rack to prevent disease transfer since the mushroom disease organisms will not attach themselves to the aluminum rack.

The Stengel U.S. Pat. No. 3,992,808 shows stackable racks for holding mushrooms. Stengel uses rods and nuts to hold the storable wood racks in a fixed relation to one another.

One of the difficulties in raising forest mushroom is that the host wood has to be maintained at proper moisture content, also the host wood generally must be treated to ensure that there are no fungal diseases or insects to compete with the mushroom. Typically, the prior art methods of maintaining the proper humidity in the host wood involve covering or wrapping the logs with a plastic sheet, burlap or straw.

The present invention provides improvements to the prior art methods of growing forest mushrooms through the utilization of waste wood known as slab wood and the use of an internal watering system that maintains the proper moisture in the host wood. The waste wood known as slab wood is especially suited for mushroom growing since it usually contains only sapwood and bark.

DESCRIPTION OF THE DRAWINGS

FIG. 1 is a pictorial view of a slab wood log;

FIG. 2 shows two slabs in face view;

FIG. 3 shows an assembled slab wood log connected to a water supply system;

FIG. 4 shows a round wood log which has been radially cut and reassembled;

FIG. 5 shows a radially cut round wood log;

FIG. 6 shows a watering system for use with the round wood logs;

FIG. 7 shows a round wood inoculation system;

BRIEF DESCRIPTION OF THE INVENTION

Figure 8:
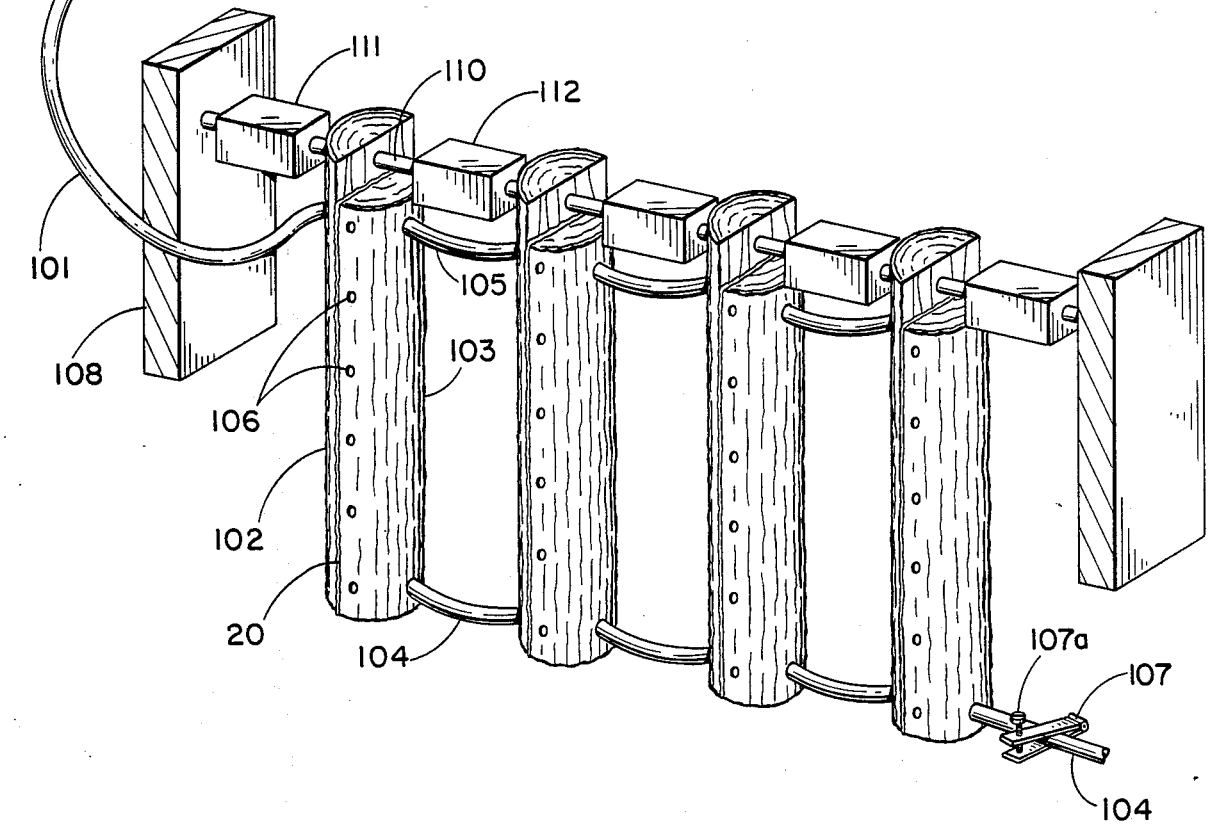
FIG. 8 shows an apparatus for vertically suspending mushroom growing logs.

Briefly, the invention comprises a number of improvements to growing of forest mushrooms. In one improvement water and nutrients are supplied internally to the host log. In another improvement the round logs are angle cut or radially cut, coated with mushroom spawn, reassembled and clamped end-to-end by a central fastening member which extends through a central hole in the heartwood.

In another improvement the host wood is formed by sandwiching together two slab wood sections to form a slab wood host log.

In another improvement the slab wood log is provided with holes or hooks so the slab wood log can be hung either vertically or horizontally.

DESCRIPTION OF THE PREFERRED EMBODIMENT

Referring to FIG. 1, reference numeral 10, generally designates a piece of slab wood 10. Slab wood is the outer log section that is left as boards are cut longitudinally from the log. Generally, the slab wood is thrown away or used as firewood. In the present invention the slab wood is utilized in a unique manner to provide host wood for the growing of mushrooms and, more particularly, Shiitake mushrooms. The slab wood logs are particularly advantageous since they already have an exposed face for inoculation with spawn. In addition, the slab logs comprise sapwood and bark. Since the mycelium does not grow in heartwood, there is no waste wood that needs extra handling.

FIG. 2 shows the face or cut side of a slab wood log 11 and a slab wood log 12 of approximately the same size. Slab log 11 has a longitudinal blind slot 14 with a set of radially slots 15 which are located at a predetermined spacing along the face of slab log 11. Similarly, located on the face of slab log 12 is a longitudinally blind slot 16 with a set of radial blind slots 17 located at a predetermined spacing along log 17. Radial slots 16 and slot 17 are longitudinally spaced so as not to align with each other when slab wood log 11 and slab wood log 12 are joined in a face-to-face manner (FIG. 3). Located around the exterior perimeter of slab wood log 11 and slab wood log 12 is a bead of caulk 20 which is used for sealing the slab wood logs together.

Radial slots 15 and 17 are used for supporting or inoculating the wood with the mushroom spores by smearing a sawdust mixture of spore, bran and calcium sulfate into the radial slots. Since the radial slots 15 and 17 are alternately spaced with respect to each other, the seeding of mushroom spore occurs at spaced intervals on alternate sides of the log.

Located on one end of longitudinal slot 16 in slab log 12 is a fluid passage 29 which connects to a flexible hose 26. Similarly, located on the other end of slot 16 is a fluid passage 28 which connects to a flexible hose 24. Also located on the perimeter of the face of log 12 is a bead of sealing caulk 20 which extends around the perimeter of log 12 to seal the edge junction of the slab wood logs 11 and 12 to each other. Before assembly of the slab wood logs the logs can be treated to destroy any disease organism. Typical nonchemical treatments includes flaming or boiling the logs. Chemical treatment usually involves treating the logs with methyl bromide.

FIG. 3 shows assembled slab wood logs 11 and 12 which are held in face-to-face relationship by nails 21. FIG. 3 also illustrates sealing caulk 20 located around the outer periphery of the junction between the faces of logs 11 and 12. The sealing of the junction between the slab logs prevents the spore from being contaminated from outside virus or insects. In order to provide the host wood with the proper amount of moisture to ensure that the spores grow rapidly, I connect one end of slot 16 to a source of water 27 through flexible hose 26. Similarly, I connect the opposite end of slot 16 to a flexible hose 24. Located on flexible hose 24 is a clamp 25 and a thumb screw 25a that can be open or closed to open or close flexible hose 24. Connecting the interior of the log to water source 27 permits one to keep the log at a proper moisture content with a minimum amount of water and thus enhance the growing of the mushrooms. The use of the second hose 24 permits one to drain or flush the log. Thus the use of internal feeding of water to the logs eliminates the problem of handling the logs by soaking the logs in water. It also eliminates the waste of water by eliminating the need to spray the logs with water.

Referring to FIG. 4 and FIG. 5, there is shown an alternate embodiment for growing of mushrooms using round wood. Reference numeral 40 generally identifies a number of short round log or round wood sections 41. FIG. 5 illustrates a single round wood log section 41 having a cut face 49 with spawn 53 smeared on the cut face 49. A central opening 52 extends through the heartwood of log 41. FIG. 4 shows five round wood logs 41 assembled end-to-end with a threaded rod 42 extending through the central longitudinal opening 52. Both ends of rod 42 have a nut 44 and washer 43 which are tightened to securely hold logs 41 in the end-to-end condition shown in FIG. 4. Also shown in FIG. 4 is a flexible hose 50 which connects to one end of longitudinal opening 52 and a flexible hose 51 which connects to the other end of longitudinal opening 52. In the embodiment of FIG. 4, the mushroom spores, usually in the form of a sawdust mixture, are spread on cut face 49 of logs 41 before logs 41 are sandwiched together in an end-to-end relationship. Thus the spores are located along the radial diameter of the logs to permit rapid longitudinal growth of the mycelium. Instead of soaking the log in water, water is supplied to the central opening 52 to insure that the moisture content of the logs remains high, i.e., the water will spread or wick its way out into the sapwood from the central passage 52. Since the mycelium do not obtain any nourishment from the heartwood, the drilling of a hole in the heartwood does not diminish the mushroom growing capabilities of the cut logs.

FIG. 6 shows an alternate embodiment 60 where the round wood log has been cut diagonally. Instead of using a central fastening member, the diagonal cuts permit one to nail adjacent cut round wood logs together. In the embodiment of FIG. 6 the spores 69 are spread on the diagonal face joining the cut logs. A central passage 74 extends through the center of logs 62, 63, 64 and 65 with a flexible hose 68 located in end log 61 and a flexible hose 67 located in end log 66. Hoses 68 and 67 permit one to connect log 60 to a source of water to maintain the necessary moisture content in the logs.

FIG. 7 shows a further embodiment for inoculating and growing mushrooms. Spaced radially along log 80 are a series of blind holes 92 which contain mushroom spawn 91. Located over the top of the blind hole 92 is a wax seal 93. In the embodiment of FIG. 7 a single log 80 is provided with a series of diagonal holes or passages 82, 84, 80, 88 and 90. Typically, log 80 is drilled to produce diagonal holes that connect to each other at the exterior surface of the log. For example, holes 82 and 84 are connected at the exterior and are sealed to the outside by wax 83. Similarly, the diagonal holes 84, 80, 88 and 90 are similarly connected and sealed by wax 85, 87 and 89. In order to provide water to the interior of log 82 there is provided a flexible hose 81 that connects to passage 82 and a flexible hose 91 that connects to passage 91. In the embodiment of FIG. 7 the spore inoculated into blind holes 92 and water is supplied to the inside of the logs.

Referring to FIG. 8, there is shown an alternate embodiment for growing mushrooms through a vertical hanging method. In the embodiment shown in FIG. 8, two slab wood sections 102 and 103 are fastened together with nails 106. Slab wood logs 102 and 103 are identical to slab wood logs 11 and 12 except that logs 102 and 103 are of unequal length. Log 102 is slightly longer than log 103, however, both the faces of the logs are sealed by sealant 20 and are fed water internally like the logs shown in FIG. 3. The longer log 102 contains a hole so that log 102 can be mounted on a horizontal rod 110 that extends through identical holes in adjacent logs to hold a number of host logs in a vertical orientation. Water is supplied to the interior of the vertical hanging host logs from a water source 100 through a flexible tubing 101 that connects to the top of first log 102. A similar flexible tube 105 connects the tops of the host wood to each other. Similarly, a series of flexible hoses 104 connect the bottom of an adjacent log to each other. The end log contains a clamp 107 and thumb screw 107a to close the flexible hose 104 to permit draining or flushing the logs. In the embodiment of FIG. 8 it is apparent that the interior of the log can be maintained at the proper moisture content while the log can be held in a vertical spaced position. The vertical orientation greatly facilitates the picking of mushrooms. In order to keep the logs in proper spacing for mushroom gathering, I provide spacers 111 and 112 which keep the logs in proper spacing from each other. The spacing which is on the order of 5 to 6 inches is sufficiently wide enough to permit an operator to reach in and pick the mushrooms from between the hanging logs. While I show the use of holes for holding slab wood, other means such as hooks placed in the end of the slab wood can be used for hanging the slab wood. Although I show continuous supply of water, I also could intermittently water the interior of the host logs.

Figure 9:
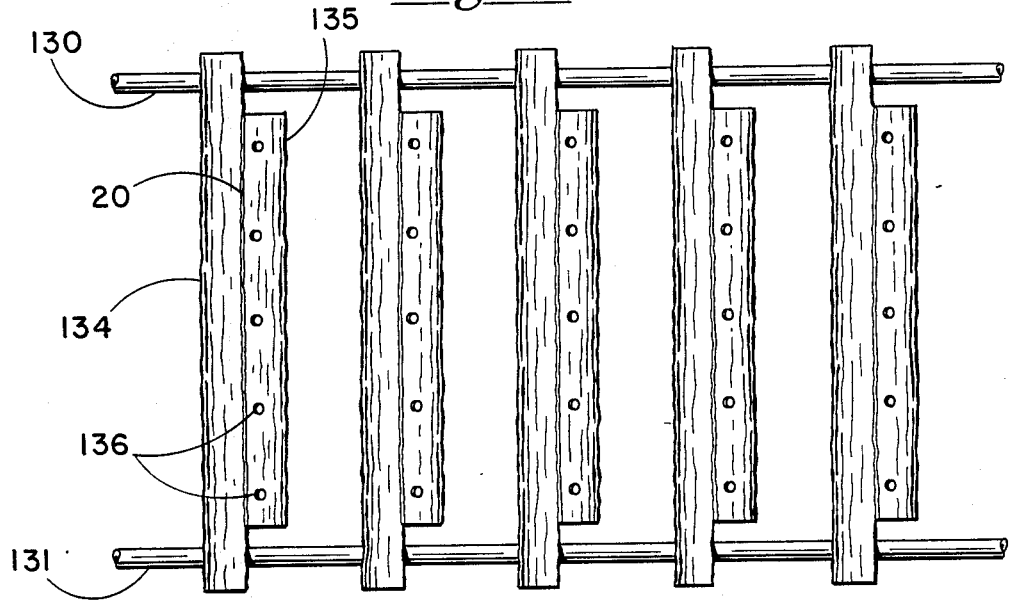
FIG. 9 shows an apparatus for horizontally suspending mushroom growing logs.

The embodiment shown in FIG. 9 is similar to the vertical slot growing technique except a horizontal growing technique is employed. The slab wood log 134 is longer than the slab wood log 135. Two slab wood logs are held together by nails 136. A sealant 20, which may be wax, prevents contaminants and insects from entering between the faces of the two logs. In the embodiment shown in FIG. 9 holes are made in opposite ends of slab log 134 to permit the slab wood logs to be placed in a spaced horizontal position on horizontal bars 130 and 131. The placing of slab logs in the horizontal also permits easy access in harvesting the mushrooms. While not shown, the slab logs of FIG. 9 could be connected to a source of water to provide water and nutrients to the slab wood. Similarly, spacers could be used to insure that the logs could be maintained in the proper space position. While logs 134 are shown with holes in both ends, one could also use a hole in one end and use a support rod to support the end of the logs from below.

Figure 10:
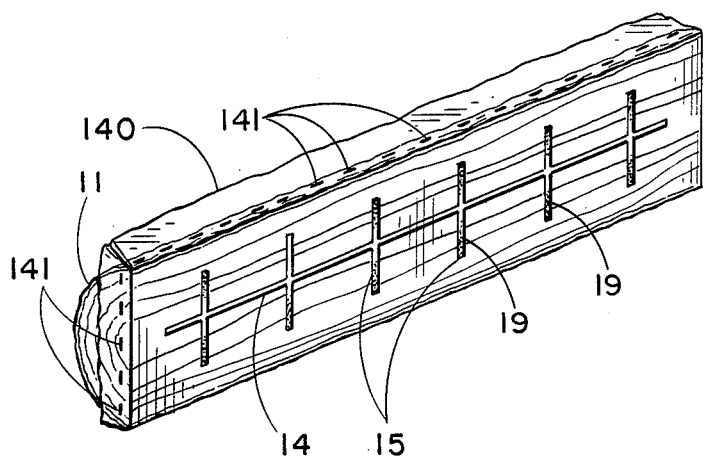
FIG. 10 shows an inoculated slab log with the face covered with plastic.

While I have shown the face-to-face attachment of slab wood logs to each other, FIG. 10 shows an alternate embodiment where I use an individual slab wood log by covering the face of log 11 with a sheet of plastic. The spawn is located in the slots 15 and 16. To retain the moisture, the plastic 140 is stapled to the sides and ends of log 11 through fastener such as staples 141. In this embodiment the slab log can be layed face down and water can be periodically added between the plastic 140 and log 11. Since water is periodically added between the plastic and the face of slab 11, I do not seal the plastic to the log.

I claim:

1. A structure for growing forest mushrooms comprising:
    a slab wood log having a longitudinal cut face and a bark back;
    a recess located in said cut face for receiving mushroom spawn;
    mushroom spawn located on the longitudinal cut face of said slab wood log; and
    a sheet of flexible film material extending over said cut face.

2. The invention of claim 1 wherein said sheet of flexible material comprises a film of polymer plastic.

3. The invention of claim 2 including staples, said staples holding said plastic film to said slab wood log.

4. A round wood log for growing forest mushrooms comprising:
    a continuous round wood log having heartwood, sapwood and external bark;
    a first plurality of holes containing mushroom spawn;
    a second plurality of holes diagonal to the surface of the external bark located along said log, said diagonal holes communicating end-to-end to form a passage through said round wood log.

5. The invention of claim 4 including means for connecting said holes to a source of water.

6. The invention of claim 5 including means for sealing the junctions of diagonal passages from the exterior of the log.

7. A structure for growing forest mushrooms comprising:
    a first slab wood log having a longitudinal cut face and a second surface with a bark covering;
    a second slab wood log having a longitudinal cut face for joining to said longitudinal cut face on said first slab wood log and a second surface with a bark covering, said slab wood including a recess located on the face of at least one of said slab wood logs;
    means for holding said cut face of said first slab wood log in contact with said cut face on said second slab wood log; and
    mushroom spawn spaced longitudinally along said slab wood.

8. The invention of claim 7 including means to supply water to the recess located in the longitudinal cut face of said slab wood log.

9. The invention of claim 8 including means for sealing the longitudinal cut faces of the slab wood logs to each other.

10. The invention of claim 9 wherein at least one of said slab wood log includes a hole in one end for hanging said slab wood log on a support member.

11. The invention of claim 10 including means for locating the slab wood logs in a spaced condition on a support member.

12. A structure for growing forest mushrooms comprising:
    a plurality of round wood logs having heartwood, sapwood and an outside bark, at least one of said plurality of round wood logs having a central opening extending through the heartwood, and at least one of said plurality of round wood logs having a cut face for receiving mushroom spawn;
    mushroom spawn located on said cut face of said round wood log;
    means for holding the cut face of the round wood log in face-to-face relation with another cut face of the adjacent round wood log to provide a host wood for mushroom growing; and
    a hose in fluid communication with said central opening to provide water to said central opening in said structure.

13. The invention of claim 12 wherein said means comprises nails.

14. The invention of claim 12 wherein said means comprise a rod extending through the heartwood of the log and means on said rod to clamp said logs in a face-to-face relation.

* * * * *